G. A. Jasper.
Cleansing Bone Black.

Nº 47,308. Patented Apr. 18, 1865.

Witnesses.
M Clemens
Fred. Curts.

Inventor.
Gustavus A. Jasper
by his attorney.
R. H. Eddy

UNITED STATES PATENT OFFICE.

GUSTAVUS A. JASPER, OF CHARLESTOWN, MASSACHUSETTS.

IMPROVEMENT IN CLEANSING AND REVIVIFYING CHARCOAL.

Specification forming part of Letters Patent No. 47,308, dated April 12, 1865.

*To all whom it may concern:*

Be it known that I, GUSTAVUS A. JASPER, of Charlestown, in the county of Middlesex and State of Massachusetts, have made a new and useful invention having reference to cleansing or revivifying the charcoal used in filters for decolorizing and filtering saccharine solutions or sirups; and I do hereby declare the same to be fully described in the following specification and represented in the accompanying drawings, of which—

Figure 3:
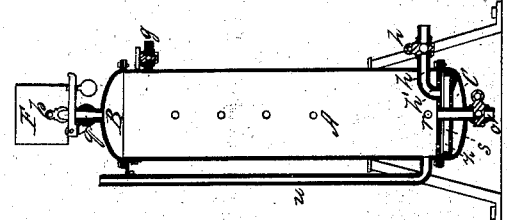
Figure 2:
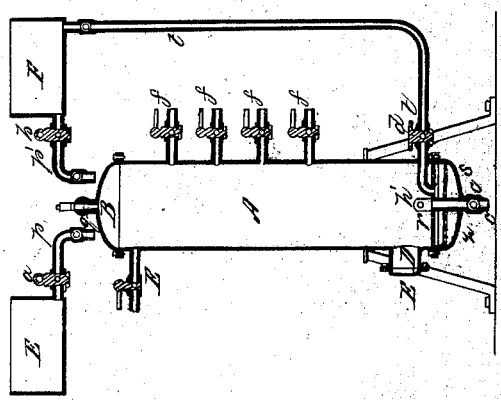
Figure 1:
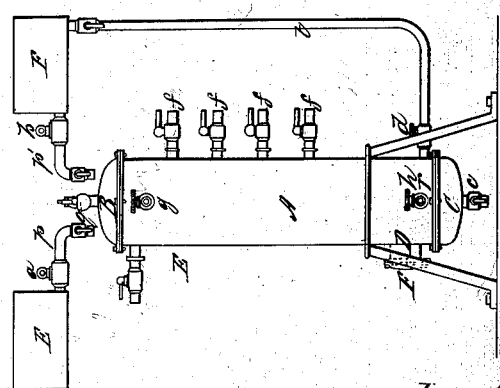

Figure 1 is a front elevation, Fig. 2 a longitudinal section, and Fig. 3 a transverse section, of the apparatus used in carrying out my invention.

After charcoal may have lost its power of decolorizing sugar-sirup, it has been customary to wash it and subsequently remove it from the filter to a retort or kiln, and therein reburn it in order to destroy the impurities which may have been collected within it.

In carrying out my invention or improvement I cleanse the charcoal while in its place in the filter without removing it therefrom, and thus I not only save the loss caused by handling and breaking up the charcoal and removing it to the oven or kiln, but I also save the expense of reburning it in the kiln and its subsequent restoration to the filter.

The filter with its auxiliary apparatus may be thus explained: In the drawings, A denotes the filter provided with an arched dome or cap, B, and having two cisterns or tanks, E F, arranged on a level above it, the cistern E being for holding the sirup. A pipe, $p$ or $p'$, leading from each of these cisterns, terminates directly over the mouth or top of the filter, and is provided with a stop-cock, $a$ or $b$, the same being so that when the cap B is off the filter, the liquid from either cistern may be discharged directly into the filter by opening the cock of the pipe of such cistern. The cap I provide with a safety-valve, as shown at $q$. There is a series of try-cocks, $f f f f$, applied to one side of the filter, and at various distances from its top, in the manner as shown in the drawings, and, furthermore, there is a stop cock, $g$, at or near its top, and another, $h$, at or near its bottom $r$, such bottom being foraminous or perforated with numerous fine holes. There is also a discharge-cock, $e$, applied to the filter, the said cock being arranged as represented in the drawings. A chambered pan or cap, C, is applied to the lower end of the filter by flanges and screws and nuts, and has a foraminous partition, $s$, extended across it horizontally, so as to form between the bottom $r$ and such partition $s$ a chamber or space, $z$, for holding the blanket or blankets, which in the common filter are placed directly on its bottom, and so that the charge of charcoal may rest immediately on the blanket or series of blankets. An escape-cock, $c$, leads out of the bottom of the vessel C. By having a blanket space or chamber, $z$, below the bottom $r$ of the filter, and separate from the charcoal space of the filter, an important advantage is gained, as it enables the blanket or blankets to be removed from the filter without first requiring the charcoal charge to be taken out of it. In fact, the separate blanket chamber renders any disturbance of the charcoal charge of the filter quite unnecessary in order to effect the removal of the blanket for the purpose of being cleansed or otherwise.

The exhaust-cock $h$ does not open out of the side of the filter, but has a pipe, $h'$, extending into the filter and down to and so as to open through the bottom $r$ and directly into the blanket-chamber.

A pipe, $t$, leads out of the blanket-chamber $z$ and from the bottom $r$ and through the side of the filter and up to the bottom of the water tank or cistern F, such pipe opening out of the cistern and being provided with a stop-cock, $d$, arranged near the filter.

The filter may be furnished with a throat, D, for removal of its charcoal when the same may be necessary, the mouth of the throat having a cover, E', secured on it in the usual manner, and, furthermore, the filter may have the usual pipe, $u$, leading out of its lower part and extending up to or above its top, such pipe being open at its upper end, and for the escape of air during the process of filling the filter with sirup.

By connecting to the stop-cock $h$ an air-exhaust pump the water and air may be exhausted from the charcoal before the sirup is suffered to flow into it from the cistern E.

By extending the pipe $t$ through the side and into the interior of the filter, and thence down to and so as to open into the blanket-chamber, the fluid from the cistern F prior to entering the charge of the filter, will first pass into the blanket chamber and will not form any cavity in the charcoal such as would be likely to be made were the pipe to open into the side of the filter. The pipe $h'$, extended from the stop-cock $h$, is for preventing the formation of a cavity in the charcoal, which would probably result were the stop-cock to open directly out of the side of the charcoal-chamber of the filter.

Having thus described the filter and the apparatus employed therewith for revivifying the charcoal, the mode or process of operating with such apparatus may be thus explained: After the charcoal may have ceased to decolorize the sirup properly, the running of the sirup into the filter should be stopped. The cocks $b$ and $c$ should be opened and the cap B be removed from the filter, so as to permit water from the cistern F to pass into and through the charge of the filter. When the water so used in washing the charcoal may have ceased to contain any saccharine matter, the cocks $b$ and $c$ should be closed and the cocks $d$ and $e$ should be opened.

As the impurities or foreign matters to be removed from the charcoal collect chiefly at or near the top of it, the upper portion of the charcoal should be stirred up for the depth of about a foot, or to such a distance as may be necessary to insure by the cleansing process a thorough separation of the refuse matters from the filtering medium.

In consequence of opening the cocks $d$ and $e$, the water from the cistern F will be caused to rush in a reversed direction, or up and through the mass of charcoal, and after it may have been suffered to run long enough the two cocks $d$ and $e$ may be closed and the cock $c$ may be opened and so as to allow the water in the charge to pass off through such cock $c$. Next the cap B should be restored to and fastened in its place on the filter, which having been accomplished, the cock $g$ should be opened and a current of steam be introduced into the filter through such cock $g$. The steam will expel through the cock $c$ the remaining water as well as the water which may condense. After the escaping steam may appear to be clean, the current of it may be suffered to flow for some ten minutes, more or less, in order to insure a thorough cleansing of the charcoal. Next, the flowage of the steam should be arrested, and the safety-valve should be opened, in order to relieve the contents of the filter from atmospheric as well as steam pressure. The cap or cover B should next be removed from the filter and the charcoal again be washed as before with clean water from the cistern F.

To facilitate matters the pipes $p\ p'$, instead of opening over the filter, may enter its side just below the cap, in which case it will not be necessary to remove the cap except for charging the filter with charcoal whenever such may be desirable.

Besides the above-mentioned method of removing impurities from the charcoal, it is necessary occasionally to treat it with a solution of muriatic or acetic acid, in order to remove from it or neutralize the lime or alkali absorbed by it from the sugar. This process may be performed in the filter in the following manner: After the first washing with water, and before steaming the charcoal, the water should be drawn through the cocks $f f f f$ and tested for the presence of alkali. It will be found, however, mostly near the top of the charge. Next the acid solution should be poured into the charge, enough being used to neutralize the alkali, after which the acid solution should be drawn off and the charcoal be thoroughly washed by suffering clean water to flow through it, as before described. The steaming process should next be carried on in manner as hereinbefore explained.

I am aware that previous to my invention it has been customary to employ steam, water, and an acid for the purpose of revivifying charcoal used in filters. Therefore I do not claim such. They have not, however, been used with mechanism or apparatus and in the manner as hereinafter described. The washing of the charcoal by reversed currents, in combination with the employment of steam of an acid solution, is believed to be new.

What I claim as my invention is as follows:

1. The washing or cleansing of the charcoal within the filter by reversed currents of water and by steam applied to it, substantially as hereinbefore described, and in combination therewith I claim the application of an acid solution, substantially in the manner and for the purpose described.

2. The combination and arrangement of the separate blanket-chamber with the filter, such chamber being so applied to the filter as to enable the blanket or blankets to be removed from it without disturbance of the charcoal charge of the filter.

3. The application of the exhaust-cock $h$ and the pipe $t$, or either, to the side of the filter and to its blanket-chamber, substantially in manner as described.

4. The combination and arrangement of the cistern F, its pipes $p'\ t$, and the discharge-cock $e$ with the filter A, the pipes $p'$ and $t$, having stop-cocks $b$ and $d$, and the whole being to operate substantially as described.

5. The combination of the filter and apparatus, or means of causing water to flow through it in reversed direction, and a means of applying steam to the filter or the contents thereof in manner and the whole being for the purpose or objects as specified.

GUSTAVUS A. JASPER.

Witnesses:
R. H. EDDY,
FREDERICK CURTIS.